US006862643B2

United States Patent
Wu et al.

(10) Patent No.: US 6,862,643 B2
(45) Date of Patent: Mar. 1, 2005

(54) USB COMPOUND DEVICE OPERATES A PLURALITY OF DEVICES BY USING THE SAME USB LOGIC CIRCUIT AND THE METHOD FOR IMPLEMENTATION THEREOF

(75) Inventors: Wen-Jen Wu, Taipei (TW); Wen-Hwa Chou, Taipei (TW)

(73) Assignee: Prolific Technology, Inc. (TW)

( * ) Notice: Subject to any disclaimer, the term of this patent is extended or adjusted under 35 U.S.C. 154(b) by 428 days.

(21) Appl. No.: 10/074,910

(22) Filed: Feb. 11, 2002

(65) Prior Publication Data

US 2003/0041205 A1 Feb. 27, 2003

(30) Foreign Application Priority Data

Jul. 13, 2001 (TW) ........................................ 90117264 A

(51) Int. Cl.⁷ .............................................. G06F 13/00
(52) U.S. Cl. ....................... 710/302; 710/313; 710/315; 710/105; 710/106
(58) Field of Search ................................. 710/305–306, 710/308–313, 300–304, 8–10, 15–16, 36, 37, 62, 63, 64

(56) References Cited

U.S. PATENT DOCUMENTS

| 5,974,486 | A  | * | 10/1999 | Siddappa ...................... 710/53 |
| 6,185,641 | B1 | * | 2/2001  | Dunnihoo ..................... 710/56 |
| 6,205,501 | B1 | * | 3/2001  | Brief et al. .................. 710/100 |
| 6,218,969 | B1 | * | 4/2001  | Watson et al. .............. 341/100 |
| 6,230,226 | B1 | * | 5/2001  | Hu et al. ..................... 710/305 |
| 6,370,603 | B1 | * | 4/2002  | Silverman et al. ............ 710/72 |
| 6,567,875 | B1 | * | 5/2003  | Williams et al. ............ 710/302 |
| 6,675,733 | B2 | * | 1/2004  | Hoshina .................. 114/144 A |
| 6,718,423 | B2 | * | 4/2004  | Zolnowsky ................. 710/313 |
| 6,721,332 | B1 | * | 4/2004  | McAlear ..................... 370/466 |
| 6,725,302 | B1 | * | 4/2004  | Benayoun et al. ............ 710/62 |

* cited by examiner

Primary Examiner—Paul R. Myers
Assistant Examiner—Raymond N Phan
(74) Attorney, Agent, or Firm—Martine & Penilla LLP

(57) ABSTRACT

A Universal Serial Bus (USB) compound device and the method for implementation thereof are disclosed. The USB compound device does not include an embedded hub but simulates a hub by a circuit or firmware. Therefore, a set of independent function devices are able to connect to a USB bus via the same set of USB logic, and the production cost can be reduced without affecting the function of the device and the facility of expansion and plug-and-play function.

31 Claims, 6 Drawing Sheets

US 6,862,643 B2

USB COMPOUND DEVICE OPERATES A PLURALITY OF DEVICES BY USING THE SAME USB LOGIC CIRCUIT AND THE METHOD FOR IMPLEMENTATION THEREOF

BACKGROUND OF THE INVENTION

1. Field of the Invention

The invention relates to a Universal Serial Bus (USB) compound device, especially regarding to a USB compound device with low production cost and unrestricted expansion, and the method for implementation thereof.

2. Description of the Related Art

Various types of communication connections and communication protocols are utilized in the connection of various devices, so that each device is able to communicate with one another. Communication connections utilize a diversity of methods to control the commands and the data flow directions. For example, in one type of communication connection, it requires a host device and a slave device. Under this system structure, the host device sends a command that allows the slave device to proceed with communication, whereas if the peripheral device does not receive the command, it is then unauthorized to proceed with communication. Therefore, under the structure, the single host device controls the commands and the data flow directions of the entire system. As for another type of system structure, there is no distinction for host and slave devices and each device of the system is able to send commands and data to one another.

During the past few years, a special interface system standard called "Universal Serial Bus" (USB) is established for communication connection. The serial interface is able to connect all kinds of peripherals to the computer system in a simple manner, thus solving the complication caused by connections of terminals with different standards between various peripherals and the computer. A USB system includes: a USB host, a USB device and USB interconnection. The USB host therein is responsible for controlling the timing and direction of data transmission on the USB. The USB device is classified into two categories, one is "hub device" that provides the USB with new connection points, and the other is "function device" that serves as the peripheral of the system, namely a mouse, a keyboard and a printer for instance. The actual connection of a USB system forms a tiered-star structure as shown in FIG. 1, where the hub is the center of each tiered-star connection.

When the USB device (a hub or a function device) is connected to USB Bus, the USB host will assign a one and only address to the device, and then the USB host communicates with the USB device according to the address; in other words, each USB device has only one address.

The USB device also includes an endpoint structure, and in the USB device, each endpoint is an independent division that acts as the data output or reception terminal during the data transmission between the USB host and the device. Each USB device may possess a set of endpoints adapted for various data transmission characteristics. The endpoints are categorized into control, bulk, interrupt, and isochronous endpoints. Except for control endpoints, which allow two-direction data transmission, the rest are further divided into input and output endpoints.

The USB device possesses a set of endpoints, not exceeding sixteen, which are used to implement device functions, and each endpoint is assigned with a one-and-only number called "endpoint number". Therefore, the combination of device address, endpoint number and data transmission direction (output or input) enables the endpoint to acquire a unique and specific address on USB Bus.

The device drivers constructed in the host device of the system communicate with the USB devices via the USB function interface programs provided by the system so as to execute the device function. That is, the device driver and the function device are a one-to-one relationship. Each USB device needs to have a corresponding function program within the host for the purpose of executing the function provided by the device in the system. In order to provide the convenience of USB plug-and-play function, several function device drivers that are commonly used are already embedded in the operating system. Hence, when the device is connected to USB Bus, the system can find the embedded software and executes the function thereof without additional software installation, thus making the USB easier to use.

Based on practicability and production cost considerations, several USB functions are usually integrated into a USB device. For example, a keyboard and a mouse are integrated into one USB device, which is called "multi-function device". The multi-function device is often classified into "composite device" and "compound device".

The internal structure of a conventional composite device 20 is shown in FIG. 2. The internal structure is the same as that of a USB device on the whole, including a USB logic 201 and a function block 202. The difference between the two is that the composite device includes a plurality of endpoints 203 that represents different functions respectively. According to USB standard, a USB device may possess up to sixteen endpoints maximum. Therefore, the composite device can utilize several endpoints therein to build up a function and utilize the other endpoints therein to build up another function. For example, the composite device can build up a mouse function 204 by endpoints 0 and 1, and then create a keyboard function 205 by endpoints 0, 2, and 3. Hence, a USB device is able to possess multiple functions according to the said design.

However, the disadvantage of the above is that the composite device is considered as a USB function device by the USB host in a USB system. Consequently, the composite device is only assigned with one address by the USB host. In other words, the embedded multiple functions thereof communicate with the USB host via the same shared USB address. The said method is different from the common function devices, which each function possesses its own independent address, and can be recognized by the host so as to load the driver for the function. For this reason, it is possible that a composite device can not utilize the embedded standard driver, and shall use the driver designed for the composite device. Meanwhile, the driver designed for the hardware device needs to be installed before the connection so as to enable the USB host to send or receive data regarding to the specific endpoints of the composite device.

Furthermore, for the reason that a USB device possesses up to sixteen endpoints maximum, the number of functions that can be constructed inside a composite device is limited.

Referring to FIGS. 3a and 3b, the diagrams show a conventional compound device 30, which is another type of multi-function device. A compound device represents a function device with an embedded hub. As shown in FIG. 3a, the conventional compound device is a keyboard device in appearance. However, the interior of the keyboard compound device 30 is constructed with a keyboard function device 310 and a hub device 320 (refer to FIG. 3b). Hence, the keyboard compound device 30 is able to provide a plurality of USB connection ports 304, 305, and enables a plurality of USB devices 306, 307 to connect to USB Bus.

In the conventional compound device, although the circuits of the keyboard function device 310 and the hub device 320 can be integrated on a single chip to reduce the production cost, the said two devices are represented as independent USB devices and each includes a set of basic circuit of the USB device. That is to say, each device has a set of USB logic circuits 311 (or 321), and the function blocks 312 (or 322). On account of each function device in the compound device being an independent USB device, each function device consequently has its own independent USB address. Meanwhile, the USB host is able to load in the embedded standard drivers according to the device type thereof and eliminate the complications caused by installation of specific drivers.

However, each USB logic circuit of the USB device represents the same interface, which is used to send and receive messages and proceed with signal format translation, to the USB host; while each function block represents one embedded function of the USB device, i.e., a keyboard, a mouse or a disk. Basically, all USB logic circuits of the USB devices have similar structures.

Hence, although the embedded functions of the compound device possess the advantage of being able to make use of standard drivers as a USB device, such type of devices however hold a disadvantage of having redundant circuits. Referring to FIG. 3b, the compound device accordingly has two sets of USB logic circuits. If one more function device is embedded in the compound device, one more set of logic is then added to the compound device.

As a conclusion from the above, in spite of the simplified circuitry as an advantage for a conventional composite device, the embedded functions thereof may not be able to use the standard drivers; whereas for a conventional compound device, the implementation of the embedded functions thereof are as convenient as that of a USB device, however, such type of devices yet possess circuitry repetition and resource wastage as the disadvantage.

SUMMARY OF THE INVENTION

One object of the invention is to provide a compound device, in which a plurality of function devices may connect to the USB via the same set of USB logic. The circuitry thereof is as simplified as in prior composite devices, and yet each function is independent in character as in prior compound devices.

Another object of the invention is to provide a design suitable for planning, in order to let users achieve planning according to different applications and number of functions desired.

The other object of the invention is to provide an implementation of a USB compound device, in which an embedded hub is absent, and the simulation of a hub is carried out by a circuit or firmware, so that a set of independent USB functions (devices) is able to connect to the host via a mutual upstream USB port while leaving the device function and augmentability unaffected, achieving a convenience of plug-and-play, and accomplishing the purpose of reducing cost.

According to the invention, the USB compound device includes: a USB transceiver, a serial interface engine and a circuitry, wherein the circuitry, one end is connected to the serial interface engine, and the other end is connected to a plurality of non-USB interfaces, via a microprocessor or controller. Such circuitry is one without functions of a USB transceiver and a serial interface engine, and is utilized to store and mange a plurality of device addresses designated by a USB as well as to proceed with data transmission.

The circuitry includes a generic endpoint state machine, an address/endpoint management mechanism and a memory module. The address/endpoint management mechanism is used to save a plurality of address/endpoint configurations. In the invention, the USB compound device executes USB standard communication protocols to communicate with the USB host via the generic endpoint state machine according to the types of the endpoints stored in the address/endpoint management mechanism; while the memory module is used to temporarily store the data being transmitted.

In addition, the plurality of address/endpoint configurations stored in the address/endpoint management mechanism include a set of address/endpoint configuration of a virtual hub, the set of address/endpoint configuration of the virtual hub is used by the circuitry when it executes the function as a hub via the USB transceiver, the serial interface engine and the microprocessor or controller.

In the meanwhile, the circuitry also includes an endpoint variable register for storing the states of the plural endpoints, the endpoint variable register is accessed and updated by the generic endpoint state machine.

The memory module includes a memory buffer and a memory management unit. The memory buffer is used for temporarily storing the data being transmitted. The memory management unit is used for accessing data from the memory buffer, including: a memory configuration mechanism of endpoint for storing the memory allocation data and the maximum packet sizes of the endpoints in the memory buffer; and a memory access control unit for accessing data from the memory buffer according to the endpoint numbers of signals and the memory allocation data stored in the memory configuration mechanism of endpoint.

Furthermore, the USB compound device further includes an application interface engine for transmitting signals and accessing data between said generic endpoint state machine, said memory access control unit, and the plural non-USB interfaces connected with said circuitry.

Based on the present invention, the invention also provides a method for enabling a plurality of function devices to connect to a USB host with the same set of endpoint numbers and have their respective and independent USB addresses, comprising the following steps: configuring the logical endpoints and the correlation between the logical/physical endpoints of the plural function devices in sequence; storing the configurations of the physical endpoints of the plural function devices; initiating the address/endpoint configurations of the plural USB function devices and communicating with the USB host in sequence by utilizing a microprocessor or controller, and then designating the plural function devices their respective USB logical addresses by the USB host; storing the USB addresses designated by the USB host; comparing the specific address of each signal transmitted from the USB Bus with the USB logical addresses; proceeding with logical/physical endpoint translation when the comparison matches; and transmitting the signal to the function device represented by the physical endpoint.

Apart from the above, grounded on the invention, the invention provides a method for implementing a virtual hub, comprising the following steps: using an address/endpoint configuration as the USB address/endpoint configuration of the virtual hub; receiving signals from or transmitting signals to a USB host by using a USB transceiver; using a serial interface engine to execute the decoding, encoding and format translation of the transmitted signals, and perform cyclic redundancy check code inspection while transmitting/receiving data; using a microprocessor or controller to communicate with the USB host in the function of a hub via software or firmware, and getting a USB address of said virtual hub from the USB host; when the address of the transmitted signal directs to said virtual hub, responding to the USB host with the microprocessor or controller according to the content of the transmitted signal; and managing other USB function devices or reporting the configurations thereof back to the USB host with the microprocessor or controller via software or firmware so as to maintain the USB tiered-star topology.

DESCRIPTION OF THE PREFERRED EMBODIMENTS

Figure 1:
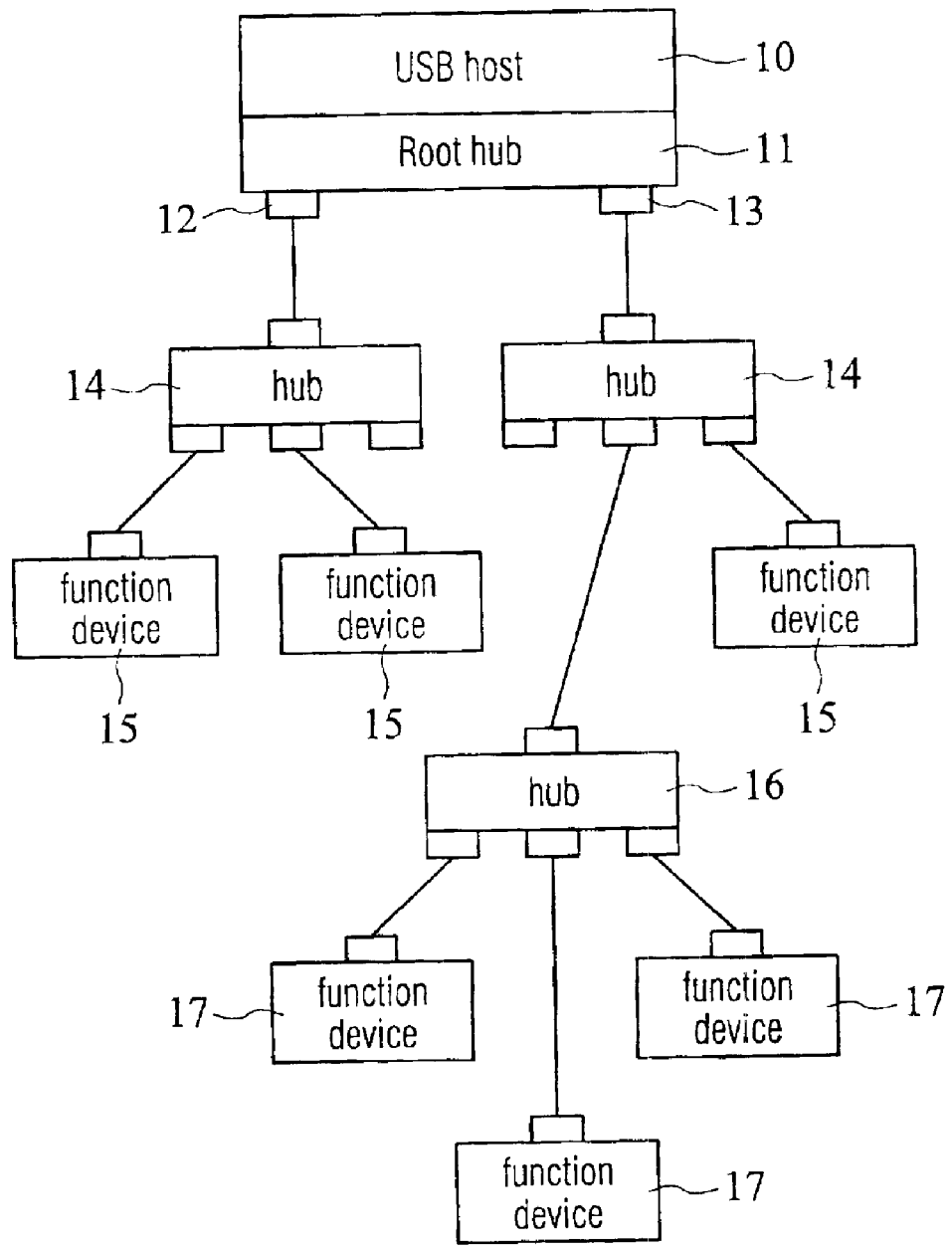
FIG. 1 is a schematic diagram showing the connection of a USB system.
Figure 2:
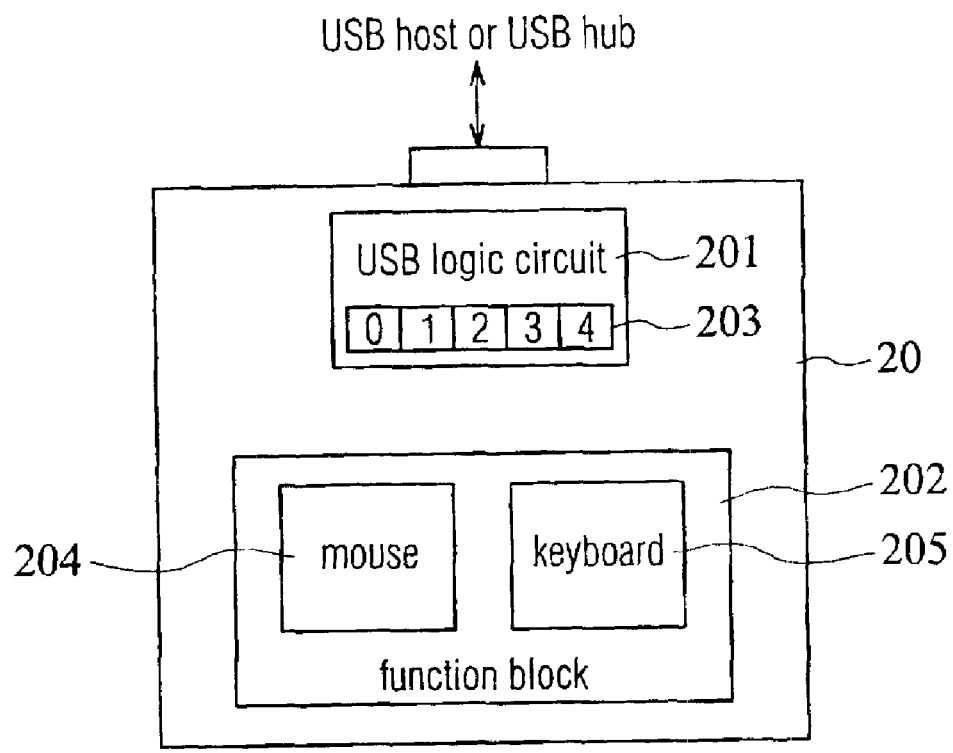
FIG. 2 is a schematic diagram of a prior USB composite device.
Figure 3A:
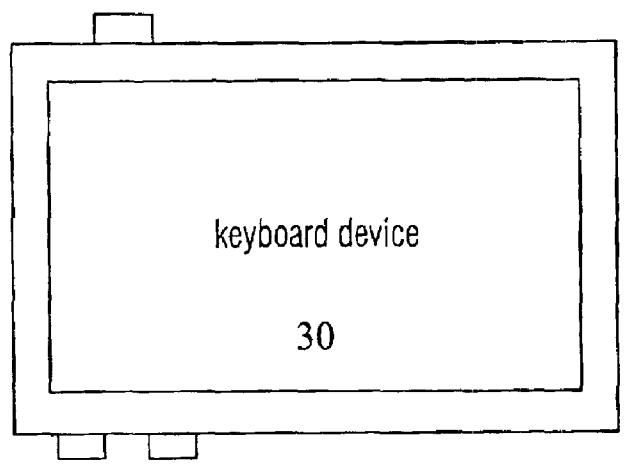
FIG. 3a is a schematic diagram showing the external structure of a prior keyboard compound device.
Figure 3B:
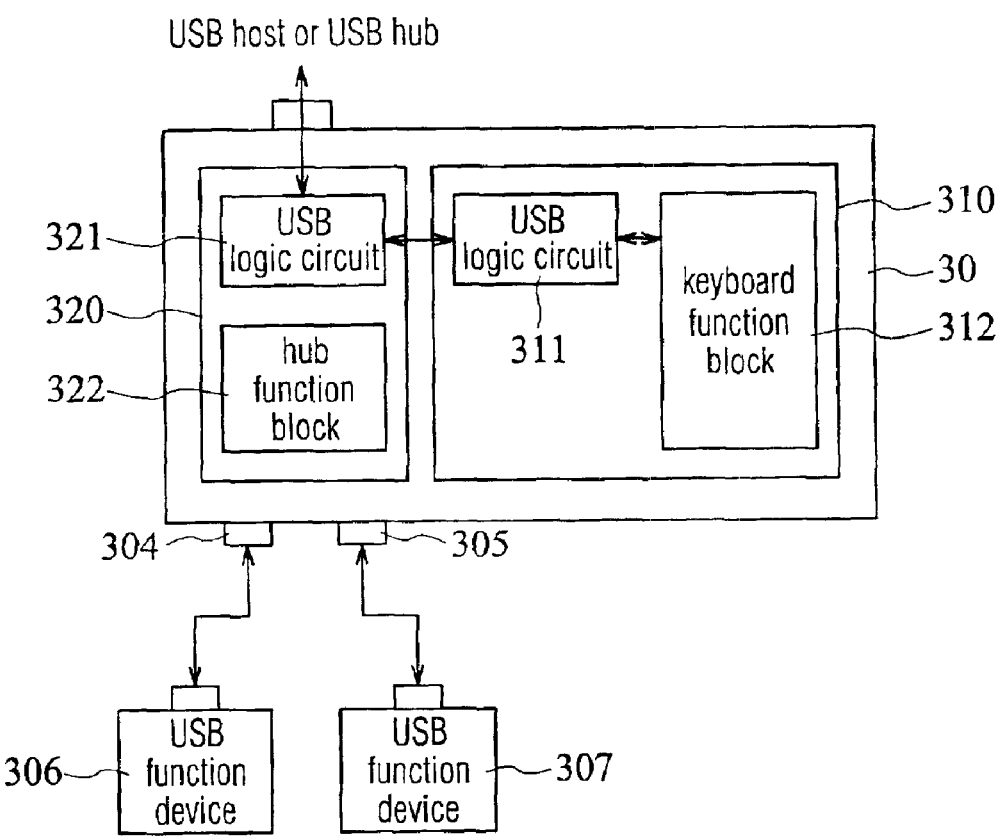
FIG. 3b is a schematic diagram showing the internal structure of a prior keyboard compound device.
Figure 4:
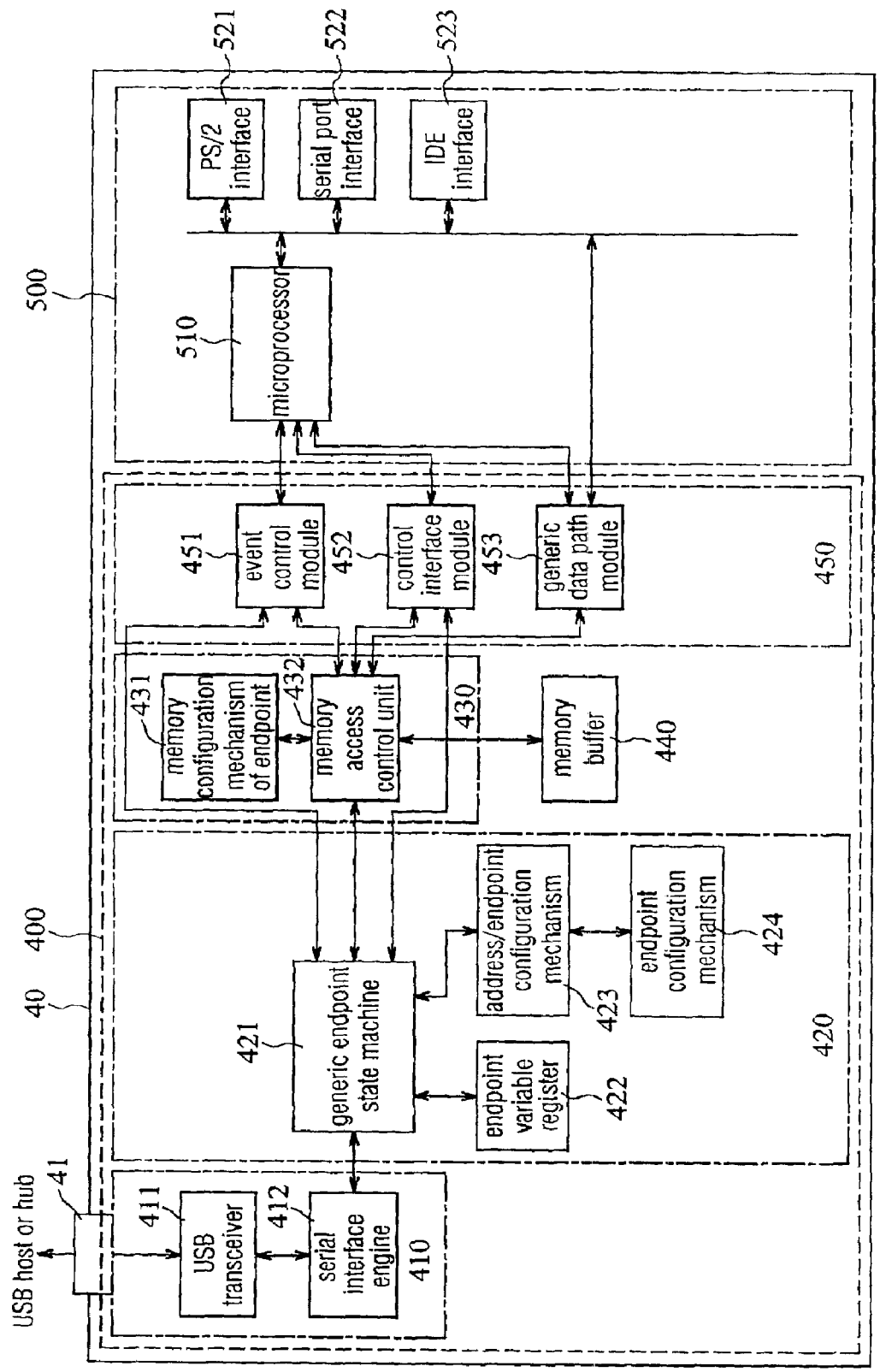
FIG. 4 is a schematic diagram showing the internal structure of the USB compound device in the first embodiment of the present invention.

Referring to FIG. 4, it is a schematic diagram showing the first embodiment of the USB compound device of the invention. The compound device 40 of the first embodiment of the invention includes a USB Logic Module 400 and an Application Function Module 500. The USB logic module 400 in the compound device 40 of the invention is designed by using the centralization of resource management, in which a plurality of sets of USB logic originally constructed in one USB compound device are integrated into one single USB logic module. Therefore, a plurality of function blocks may connect to USB Bus via the same set of USB logic circuit. The hardware wastage caused by the conventional USB compound devices and the disadvantage possessed by the conventional USB composite devices of being unable to use the standard drivers are solved.

In the first embodiment, the USB logic module 400 in the compound device 40 of the invention can be divided into five blocks according to their functions: a USB Physical Layer Block 410, a USB Link layer Block 420, a Memory Management Unit 430, a Memory Buffer Block 440, and a Application Interface Engine 450.

The physical layer block 410 of the USB logic module 400 is the connection point where the compound device 40 physically connects to USB Bus. It includes a USB Transceiver 411 and a Serial Interface Engine (SIE) 412.

The link layer block 420 of the USB logic module 400 is used to execute USB standard communication protocols, and includes a Generic Endpoint State Machine 421, an Endpoint Variable Register 422, an Address/Endpoint Configuration Mechanism 423, and an Endpoint Configuration Mechanism 424.

The memory management unit 430 is responsible for storing data into the memory buffer 440 according to the signals received from the USB link layer block 420 and the application interface engine 450, or reading data from the memory buffer 440. The memory management unit 430 includes a Memory Configuration Mechanism of Endpoint 431 and a Memory Access Control Unit 432.

The application interface engine 450 is in charge of the communication with the link layer block 420, the memory management unit 430, and the application function module 500, and is used to inform the application function module 500 about the state on USB Bus through events or interrupt. The application function module 500 then transmits data with the application interface engine 450 based on the type of the event, so as to implement specific function. The application interface engine 450 includes an Event Control Module 451, a Control Interface Module 452, and a Generic Data Path Module 453.

As for the application function module 500, it is consisted of a Microprocessor 510 and a PS/2 Interface 521, a Serial Port Interface 522 and an IDE Interface 523. In the compound device of the invention, a micro controller may also implement the function of the microprocessor.

The internal structure of the compound device 40 in the embodiment is described in substance as above. The operation and the functions of the internal structure of the device are then illustrated in detail taking FIG. 4 as reference.

First of all, regarding to the application function module 500, if a keyboard device is connected to the PS/2 interface 521, a mouse device is connected to the serial port interface 522, and a hard disk device is connected to the IDE interface 523, the microprocessor 510 then assigns a set of address/endpoint configuration, which includes a predetermined address/endpoint, to the keyboard device, the mouse device and the hard disk device in sequence according the configurations predetermined in the address/endpoint configuration mechanism 423 of the link layer block 420. For example, assigns a set of address/endpoint configuration "2", including the predetermined address 2 and logical endpoints 0, 1, and 2, to the keyboard device; assigns a set of address/endpoint "3", including the predetermined address 3 and logical endpoints 0 and 1, to the mouse device; and then assigns a set of address/endpoint configuration "4", including the predetermined address 4 and logical endpoints 0, 1, and 2, to the hard disk device. In addition, for the reason that the compound device 40 of the invention possesses "virtual hub" function, the microprocessor 510 also assigns a set of address/endpoint configuration "1", including the predetermined address 1 and logical endpoints 0 and 1, to the virtual hub. The virtual hub function as used in the compound device of the invention is to be explained in the following.

Then, the microprocessor 510 defines buffer block in the memory buffer 440 for each of the endpoints of the devices via the control interface module 452 in the application interface engine 450. The buffer blocks are used as data register blocks of the endpoints in the transmission process. In the meantime, each endpoint's configuration data in the memory buffer 440 is stored in the memory configuration mechanism of endpoint 431. The memory configuration mechanism of endpoint 431 is also used to register the endpoints' data status in their data register blocks.

Further, the microprocessor 510 connects to the generic endpoint state machine 421 in the link layer block 420 via the control interface module 452. The microprocessor 510 stores the configurations of each endpoint, such as endpoint types or maximum packet sizes, into the endpoint configuration mechanism 424 in the link layer block 420 via the generic endpoint state machine 421.

When the compound device is attached to USB Bus, the USB host can detect that a new device is attached to the Bus and sends a series of USB commands to the compound device to recognize and configure the device. At this point, the transceiver 411 in the physical layer block 410 converts the signal received from USB Bus into digital signal of logic level, and then transmits the signal to the serial interface engine 412. The transceiver 411 is also able to convert the digital signal received from the serial interface engine 412 into USB standard signal, so as to send the signal to USB Bus.

The main functions of the serial interface engine 412 are as following: in receiving mode, it is responsible for decoding the transmitting signals, converting the USB serial data flow into parallel data flow, performing the cyclic redundancy check code inspection of data to determine the exactitude of data, and changing the signals received from USB Bus into logical packets, which is then transmitted to the generic endpoint state machine 421 in the USB link layer block 420; while in transmission mode, the serial interface engine 412 is in charge of receiving data from the link layer block 420, converting USB parallel data flow into serial data flow, which is then coded, calculating the cyclic redundancy check code inspection and producing synchronous signals, which are changed into USB signals via the USB transceiver 411 and transmitted to the USB host.

When the generic endpoint state machine 421 in the link layer block 42 receives the USB command from the USB host, it sends the signal to the event control module 451 in the application interface engine 450, which again sends the signal to the microprocessor 510. At this point, the microprocessor sends back the predetermined endpoint of the virtual hub and the configuration thereof to the USB host, so that the USB host considers the compound device 40 as a USB hub device, and assigns a USB address to the virtual hub. Then the USB address assigned by the USB host is added to the predetermined address "1" of the virtual hub, and is stored together with the corresponding logical endpoint in the address/endpoint configuration mechanism 423.

The main functions of the address/endpoint configuration mechanism 423 are to store the address with the corresponding endpoint of every function device connected to the compound device, and one set of address and the corresponding endpoints of the virtual hub. In terms of USB standard, the front identification information of each package of data transmitted is the address and endpoint number of the target device and the transmitting token used to define the transmission type. Therefore, when the physical layer block 410 in the compound device 40 receives the message from USB Bus, the generic endpoint state machine 421 in the link layer block 420 compares the address/endpoint data stored in the address/endpoint configuration mechanism 423 with the identification information of the data transmitted, to determine whether the target device of the data packet is one of the multiple functions connected to the compound device 40.

As described in preceding words, when the compound device 40 is connected to USB Bus, the device first procures an address of the virtual hub assigned by the USB host. Then the USB host periodically inquires for the state of the virtual hub in a polling manner. Because the address/endpoint of the virtual hub is already stored in the address/endpoint configuration mechanism 423, the front-end address/endpoint information of the message that the USB host sends to the hub, an inquiry command for example, can be recognized by the generic endpoint state machine 421. When the front-end information sent is confirmed to be the same with the address/endpoint included in the address/endpoint "1", that is, the same with the address/endpoint of the virtual hub, this message is sent to the microprocessor 510 by the event control module 451. When the microprocessor 510 receives the event corresponding to the address/endpoint configuration "1", it recognizes that the data packet belongs to the virtual hub and makes a response according to the content of the message. In the compound device 40 of the embodiment, a circuitry designed exclusively for the USB hub is absent, and thus all the functions related to the hub are simulated and executed by the microprocessor 510 via software or firmware.

Therefore, in every inquiry action performed by the USB host, the microprocessor 510 acts as a hub and continually reports back to the USB host on the augmentation of new functions through the control interface module 452, the generic endpoint state machine 421, the serial interface engine 412 and the USB transceiver 411. The keyboard, mouse and hard disk functions are added into the USB system after being identified and assigned with a USB address by the USB host. Whereas to the USB host, it seems that the function devices, i.e., keyboard, mouse and hard disk, are connected to the virtual hub, and maintain the connection relationship as required between the hub and the function devices in USB system. Consequently, each of the keyboard, mouse, and hard disk functions has its own independent USB address, and in the meanwhile, the address with the corresponding endpoints of each function are stored in the address/endpoint configuration mechanism 423.

In addition, in the link layer block 420, the endpoint variable register 422 is utilized to store the states of various endpoints, which are then accessed and updated by the generic endpoint state machine 421. Hence, when the USB host directs inquiry commands about the states of various devices towards the virtual hub of the compound device 40, the microprocessor 510 reads the latest states of various devices from the endpoint variable register 422 via the generic endpoint state machine 421, so as to respond to the USB host. Therefore, the USB host regards the compound device 40 as a USB hub device in connection with a keyboard device, a mouse device, and a hardware device. That is, the compound device 40 still maintains the tiered-star structure of USB standard.

The above description is related to the interface initiation carried out when the compound device 40 in the embodiment is connected to USB Bus and the method that the compound device 40 simulates a hub. Hereinafter, the interactions between the link layer block 420 and the memory management unit 430, the memory buffer 440 and the application interface engine 450, and the functions of individual blocks, are illustrated in detail by using the data transmission process.

First of all, when the physical layer block 410 receives a packet of data from the USB host, the generic endpoint state machine 421 primarily uses the address/endpoint stored in the address/endpoint configuration mechanism 423 to compare with the identification information of the front-end of the data, and notifies the physical layer block 410 of the outcome. When the address and the endpoint number match, that is, when the target device of the data is confirmed to be one of the multiple functions in the compound device of the embodiment, the generic endpoint state machine 421 fetches the endpoint configuration of the endpoint number from the endpoint configuration mechanism 424, reads the former state of the endpoint from the endpoint variable register 422, and then communicates with the USB host and transmits data according to the endpoint type, interrupt, bulk, isochronous and control for instance, via the physical layer block 410. At the same time, when the comparison of the address and the endpoint is exact, the generic endpoint state machine 421 also informs the memory management unit 430 and the application interface engine 450 about the address/endpoint configuration number and the endpoint number.

Hereinbelow, the functions of the memory management unit 430 and the application interface engine 450 are described.

The memory management unit 430 includes the Memory Configuration Mechanism of Endpoint 431, and the Memory Access Control Unit 432.

The memory configuration mechanism of endpoint 431 is used to store the distributed buffer block of individual endpoint and the data status thereof in the Memory Buffer 440. When the memory access control unit 432 receives the impulse signals, address/endpoint configuration number and the endpoint number thereof from the generic endpoint state machine 421, it loads the configuration and the variables of the endpoint, and then fetches the current data status of the endpoint from the memory butter configuration mechanism of endpoint 431, and reports to the generic endpoint state machine 421, which then determines how to communicate with the USB host. If the data can be uploaded, the memory access control unit 431 reads the data from the memory buffer block 440 and uploads the data to the USB host via the generic endpoint state machine 421; if the data can be downloaded, the generic endpoint state machine 421 sends the data to the memory access control unit 432, the data is then stored into the corresponding buffer block of the endpoint in the memory buffer block 440. Furthermore, the memory management unit 432 simultaneously notifies the event control module 451 in the application interface engine 450 about the data status of the data in the buffer block.

The application interface engine 450 includes the Event Control Module 451, the Control Interface Module 452, and the Generic Data Path Module 453.

The event control module 451 therein, is used to receive events from the generic endpoint state machine 421 and the memory access control unit 432. It then informs the microprocessor 510 in the application function module 500 after the events are encoded. The microprocessor 510 can make a response according to the address/endpoint configuration number, the event type, the USB command, and the data received or the data request.

The control interface module provides three main functions, one of which is to allocate the various above-mentioned configurations, the address/endpoint configuration number, endpoint type and buffer block for example, during the interface initiation of the multiple functions of the application function module 500; another function is to facilitate the communication of the microprocessor 510 with the USB host by directing the USB link layer block 42 to take necessary actions, or to read the states of various endpoints to decide the required responses; the other function is that the microprocessor 510 can transmit data with the memory management unit 430 via this module, for example, reading USB command parameters, decoding command types or filling in data demanded by the USB host.

The generic data path module 453 is used to enable the plurality of functions of the application function module 500 to do mass data access. For certain executions of functions, such as reading data from hard disk, or transmitting data, the module enables the functions to directly read or store the data in the memory buffer block via the memory management unit 430, without the interference of the microprocessor 510, and thus optimizing the transmission efficiency.

It is mentioned previously that when the compared result of the address/endpoint number processed by the generic endpoint state machine 421 matches with the information stored in the address/endpoint configuration mechanism 424, the generic endpoint state machine 421 informs the memory management unit 430 and the application interface engine 450 about the address/endpoint configuration number and the endpoint number. In the memory management unit 430, it is the memory access control unit 432 responsible for receiving the message sent by the generic endpoint state machine 421. Meanwhile, according to the message, the memory access control unit 432 fetches the configuration of the endpoint in the memory buffer block 440 from the buffer configuration mechanism of endpoint 431, in order to store the data sent subsequently sent by the generic endpoint state machine 421 into the buffer block corresponding to the endpoint.

In the application interface engine 450, it is the event control module 451 to receive the message sent by the generic endpoint state machine 421. The event control module 451 then transmits the message inclusive of the address/endpoint configuration number to the microprocessor 510. The microprocessor 510 eventually recognizes the function represented by the address/endpoint configuration number. In case of the corresponding function of the address/endpoint configuration number is the hard disk device, the microprocessor 510 can communicate with the memory access control unit 432 via the control interface module 452, and then read data from the memory buffer block 440 and send it back to the hard disk device.

In addition, function devices, the hard disk device for example, may utilize the generic data path module 453 to directly communicate with the memory access control unit 432, and directly access mass data from the memory buffer block 440. As mentioned formerly, the design of the generic data path module 453 may effectively enhance the transmission efficiency.

The description above is the illustration on the internal structure of the compound device and the functions thereof in the first embodiment of the invention. By the design of the first embodiment of the invention, the compound device is able to simulate the function of a USB hub by its internal integrated circuit and enables the plurality of function devices connected to it to possess their independent USB addresses. Therefore the USB host regards the compound device as a combination of a USB hub connected with a plurality of function devices. As a result, each function device connected to the compound device in the embodiment is able employ the standard drivers embedded in the system, and thus achieving the plug-and-play function. Furthermore, the USB logic circuit of the compound device in the embodiment is designed by using the centralization of resource management, in which a plurality of sets of USB logic originally made within one USB compound device is integrated into one single USB logic module, so that the plurality of function blocks may connect to USB Bus via the same set of USB logic circuit. The design settles the disadvantage of the repetition of circuits in prior compound devices, and significantly reduces the production cost thereof at the same time.

Figure 5:
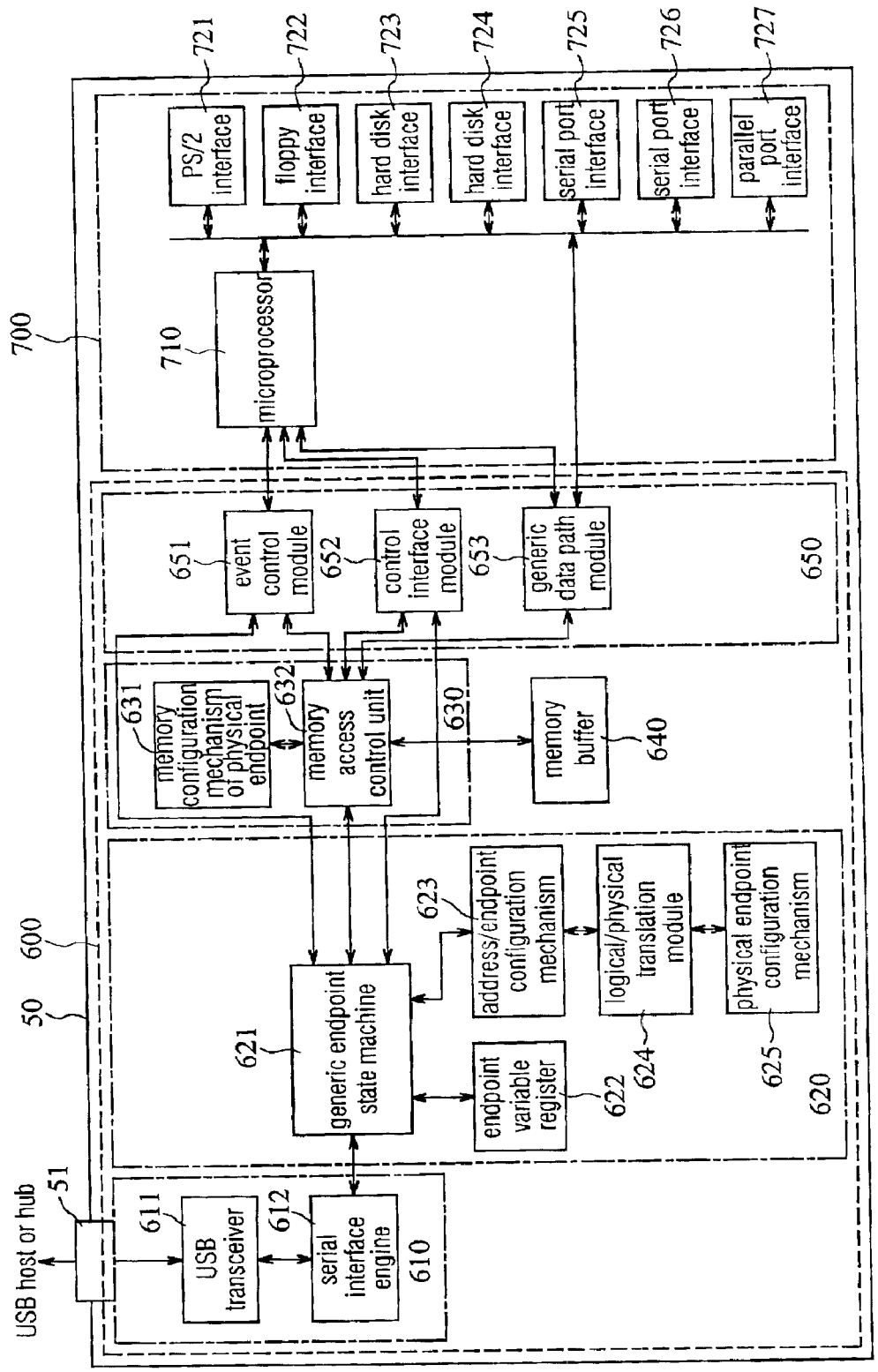
FIG. 5 is a schematic diagram showing the internal structure of the USB compound device in the second embodiment of the present invention.

Referring to FIG. 5, it shows the schematic diagram of the USB compound device in the second embodiment of the invention. The compound 50 comprises a USB logic module 600 and an application function module 700. The USB logic module 600 of the compound device in the embodiment is similar to the structure of that in the first embodiment, both having the physical layer block 610, the link layer block 620, the memory management 630, the memory buffer 640 and the application interface engine 650.

The physical layer block therein includes a USB transceiver 611 and a serial interface engine 612, and its function is entirely the same as in the first embodiment, and therefore is not copiously described further.

However, the link layer block 620 of the embodiment is slightly different from that of the first embodiment. Referring the FIG. 5, the link layer block 620 includes a logical/physical endpoint translation module 624 and a physical endpoint configuration mechanism 625, apart from a generic endpoint state machine 621, an endpoint variable register 622 and an address/endpoint configuration mechanism 623.

In the meanwhile, the memory management unit 630 of the embodiment, besides the memory access control unit 632, a memory configuration mechanism of physical endpoint 631 is used to replace the memory configuration mechanism of endpoint 431 of the first embodiment.

It also can be observed from the figure that, the application function module 700 of the embodiment, includes 7 interfaces altogether: a PS/2 interface 721, a floppy interface 722, two hard disk interfaces 723 and 724, two serial port interfaces 725 and 726, and a parallel port interface 727. The type and number of the function devices connected to the compound device in the present embodiment of the invention are not restricted by the immobile allocation relationship between address and endpoints as in the first embodiment, in which only limited number of specific function devices may be connected to the compound device. In the first embodiment, the microprocessor 510 utilizes the address/endpoint configurations of the function devices, including the address and endpoint numbers, to identify each function and allocate the buffer blocks. As a result, the configurations assigned to various function devices, for example, the address/endpoint configuration "2" including a predetermined address 2 and fixed logical endpoints 1, 2, and 3, restricts the type of function devices to which it may be connected. Therefore, in the first embodiment, the type and number of function devices to which the application function module may be connected are consequently restricted.

The second embodiment of the invention provides a method to enable the compound device 50 not only to possess the integrated USB logic circuit as in the first embodiment and the advantage of USB "plug-and-play" function, but also to overcome the restriction on the type and number of the connected function devices. The characteristics of the second embodiment are described hereinafter.

Firstly, the microprocessor 710 constructed in the application function module 700 allocates a set of physical endpoint numbers to each of the function devices, which connected to the seven interfaces, according to their respective requirements. For example, it allocates the physical endpoint numbers "0" and "1" to the mouse device, which is connected to the PS/2 interface 721, and the physical endpoint numbers are corresponding to the logical endpoint numbers "0" and "1" of the mouse device; it allocates the physical endpoint numbers "2", "3", and "4" to the floppy device, which is connected to the floppy interface 722, and the physical endpoint numbers are corresponding to the logical endpoints "0", and "2" of the floppy device; and it allocates the physical endpoint numbers "5", "6", and "7" to the hard disk device, which is connected to hard disk interface 723, and the physical endpoint numbers are corresponding to the logical endpoints "0", "1", and "2" of the hard disk device, etc. Besides, the microprocessor 710 also allocates a set of physical endpoint numbers to the virtual hub so that the compound device 50 may use them during the hub simulation process. In the meanwhile, the microprocessor 710 stores the physical endpoint configurations of each function device, such as the endpoint type and the maximum packet size, into the physical endpoint configuration mechanism 625 in the link layer block 620 via the control interface module 652 and the generic endpoint state machine 621.

The corresponding method of physical endpoints and logical endpoints described above allows various addresses, or function devices, to be arbitrarily allocated the endpoint types and numbers according to the characteristics of the function devices. Therefore, the application range of the compound device 50 in the second embodiment is broadened.

In the embodiment, the "physical endpoint number" is the identification information used by the microprocessor 710 to identify various function devices, and is not the address/endpoint configuration inclusive of the address and the endpoint number regarded as the identification information of various function devices as in the first embodiment.

The following steps are similar to that of the first embodiment, the microprocessor 710, via the control interface module 652 in the application interface engine 650, defines buffer blocks for the physical endpoints in the memory buffer 640 according to the physical endpoint numbers of the function devices. When this process is complete, it then stores the configuration data of various physical endpoints in the memory buffer 640 into the memory configuration mechanism of physical endpoint 631.

When the compound device 50 is connected to USB Bus, the USB host detects a new device being connected to the Bus, and sends a series of USB commands to identify and configure the device simultaneously. For the time being, the physical layer block 610 sends the message to the generic endpoint state machine 621 in the link layer block 620, and then the generic endpoint state machine 621 sends the message to the event control module 651, which sends the message further to the microprocessor 710. At this point, the microprocessor 710 defines a set of physical endpoint numbers as the logical endpoint of a virtual hub, and sends the logical endpoint and the configurations of the virtual hub back to the USB host. Therefore, the USB host considers the compound device 50 as a hub device, and designates a USB address to the virtual hub. Then, the USB address of the virtual hub, and correspondence of the logical endpoint and the physical endpoint thereof, are stored together in the address/endpoint configuration mechanism 623.

In the link layer block 620 of the embodiment, the endpoint variable register 622 is used to store the states of various physical endpoints, which are then accessed and updated by the generic endpoint state machine 621. As for the logical/physical translation module 624, it is used to proceed with the translation of logical/physical endpoint, so as to facilitate the microprocessor 710 to identity of function device represented by the physical endpoint number.

After that, the USB host periodically inquires the state of the virtual hub in a polling manner. For the reason that the logical address/endpoint is already stored in the address/endpoint configuration mechanism 623, the front-end logical address/endpoint information of the message sent by the USB host to the virtual hub, a inquiry command for instance, is identified by the generic endpoint state machine 621. When the logical address/endpoint is confirmed to be consistent with that of the virtual hub, the logical/physical translation module 624 translates the logical endpoint to its physical endpoint. Then the generic endpoint state machine 621, via the event control module 651, informs the microprocessor 710 about the physical endpoint. In the compound device 50 of this embodiment, there is no circuitry designed exclusively for the USB hub, and therefore all actions related to hub functions are simulated and executed by the microprocessor 710 through software or firmware.

In every inquiry, the microprocessor 710 communicates with the USB host in a role of a hub, and reports on the new connected devices to the USB host in sequence. According to the message, the USB host initiates the enumeration of the function devices and designates a USB address to each function device after the enumeration. Then, the USB address and the correlation between the logical endpoint and the physical endpoint thereof are stored in the address/endpoint configuration mechanism 623. For example, the microprocessor 710 responds to the inquiry of the USB host by corresponding the physical endpoint numbers 2, 3, and 4 to the logical endpoints 0, 1, and 2 of a floppy device, to acquire a USB address; and then the similarly responds to the inquiry of the USB host by corresponding the physical endpoint numbers 5, 6, and 7 to the logical endpoint numbers 0, 1, and 2 of a hardware device, to acquire a USB address. Owing to the USB address and the correspondence between its logical endpoint and physical endpoint of each function device are stored in the address/endpoint configuration mechanism 623, the microprocessor 710 is still able to accurately identify the exact function device represented by the each address/endpoint according to the USB address and the correlation between the logical endpoint and the physical endpoint thereof though the plurality of function devices connected to the compound device in the embodiment use the same logical endpoint numbers. In other words, the configuration and translation of logical/physical endpoints proposed by the embodiment enables the compound device to augment the type and number of the function devices unrestrictedly according to the requirement of the user.

As a result, the USB compound device in the embodiment not only has the advantages of the compound device in the first embodiment, but is also provided with an augmentability character, which makes the usage of the USB compound device more extensive and convenient.

Figure 6:
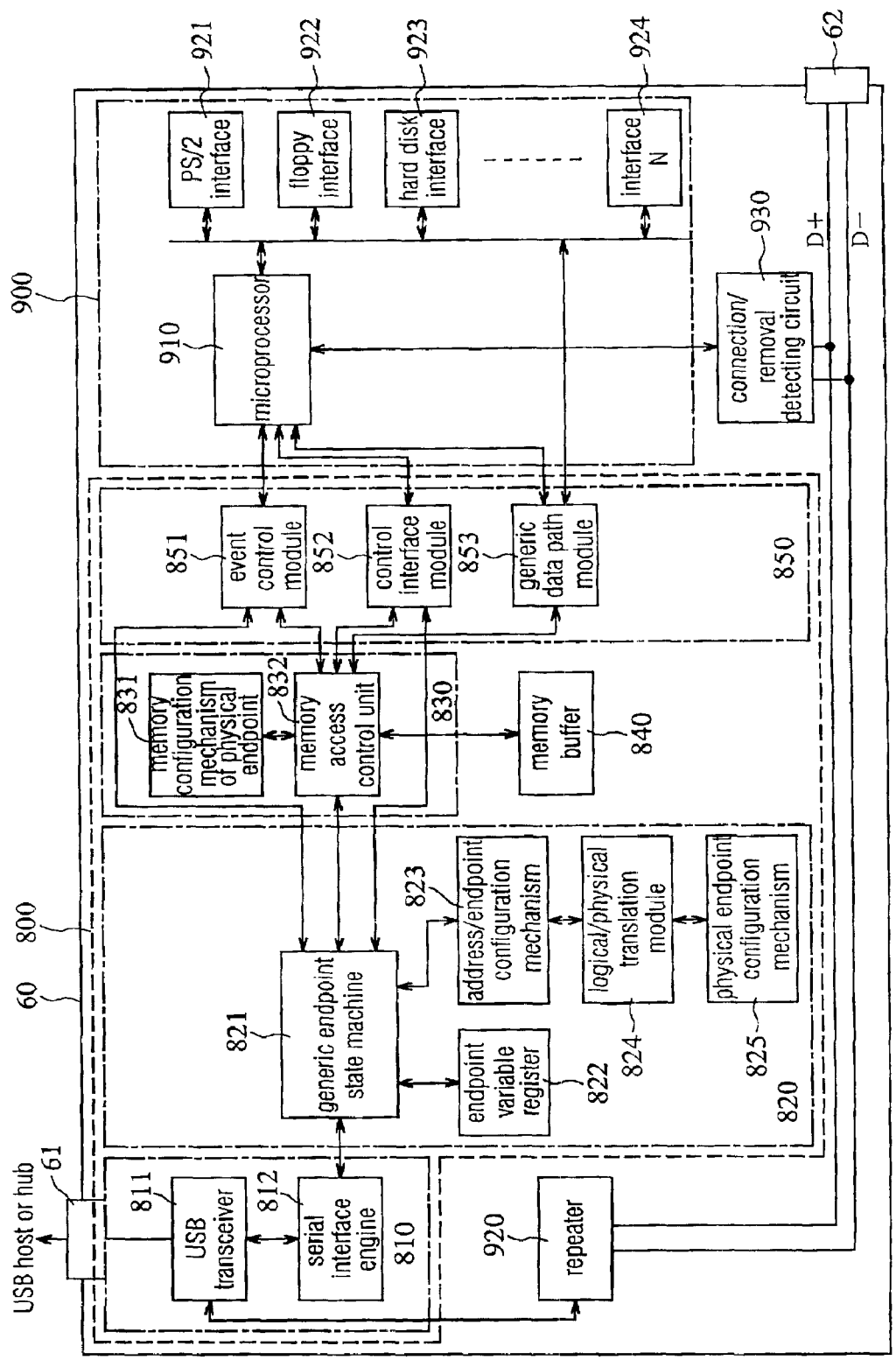
FIG. 6 is a schematic diagram showing the internal structure of the USB compound device in the third embodiment of the present invention.

Referring the FIG. 6, it shows the schematic diagram of the USB compound device in the third embodiment of the invention. It is observed in the figure that the main internal structure of the USB compound device 60 of the embodiment is the same as that of the second embodiment. The difference between the two is that the USB compound device 60 in the embodiment additionally comprises a repeater 920 and a set of connection/remove detecting circuit 930. The repeater 920 and the connection/remove detecting circuit are illustrated thereinunder with the aid of FIG. 6.

It is observed from the figure that the message from a USB host can be transmitted via the USB transceiver 811 to the repeater 920, which implements the function as a repeater in the USB hub. Furthermore, the USB compound device in the embodiment is also provided with a set of connection/removal detecting circuit 930, which is connected to the downstream port 62 and is employed to detect the connections or removals of external USB devices. (Note: The USB compound device 60 in the embodiment as well as the compound devices 40 and 50 in the first and second embodiments all have another set of connection/removal detecting circuit, which connects to respective upstream ports 41, 51, and 61, and is used by a USB host or hub to detect connections or removals of devices. However, the circuit is not drawn in the figure for simplification.)

When a USB device is connected to the downstream port 62, the connection/removal detecting circuit 930 detects the change in electric potential or current, and notifies the microprocessor 910. At this moment, the microprocessor 910 of USB compound device 60 is able to simulate actions of a USB hub as in the first and second embodiments. It informs the USB host about the message via the USB logic 800 to make the USB device connect to the Bus.

As a result, a plurality of downstream ports, which are able to connect to external USB devices, may be added to the USB compound device 60 in the embodiment. Therefore, a plurality of USB devices are able to connect to the USB Bus via the USB compound device in the embodiment.

Although the description of the preferred embodiments of the invention is explained in specific manners as above, nevertheless, it is understood that the aforesaid examples are only illustrative. Various modifications and alterations can be made without departing from the true spirit and scope of the invention as defined by the appended claims.

What is claimed is:

1. A USB compound device, utilized to connect a plurality of function devices to a USB Bus and make the connected function have the advantage of "plug-and-play" function, comprising:

a USB transceiver for utilizing as the connection point between the plurality function devices and the USB Bus, transmitting signals to or receiving signals from the USB Bus and performing the signal format conversion;

a serial interface engine (SIE) for decoding the signals received from the USB Bus and then transforming them from serial form into parallel form, coding the signals to be transmitted to the USB Bus after transforming them from parallel form into serial form, and performing cyclic redundancy check code inspection while transmitting/receiving; and a circuitry for storing and managing a plurality of device addresses designated by a USB host, and proceeding with data transmission, wherein said circuitry does not have the functions of said USB transceiver and said SIE, and its one terminal is connected to said SIE while the other terminal is connected to a plurality of non-USB interfaces, which are used to connect to the plural function devices, via a microprocessor or controller.

2. The USB compound device as described in claim 1, wherein the circuitry comprising:

a generic endpoint state machine;

an address/endpoint management mechanism for storing a plurality of address/endpoint configurations, wherein said USB compound device executes USB standard communication protocols to communicate with the USB host via said generic endpoint state machine according to the types of the endpoints stored in said address/endpoint management mechanism; and a memory module for temporarily storing data being transmitted.

3. A circuitry in the USB compound device as described in claim 1, wherein the circuitry includes:
- a generic endpoint state machine;
- an address/endpoint management mechanism for storing a plurality of address/endpoint configurations, wherein the USB compound device executes USB standard communication protocols to communicate with the USB host via said generic endpoint state machine according to the types of the endpoints stored in said address/endpoint management mechanism; and
- an endpoint variable register for storing the states of the plural endpoints, said endpoint variable register is accessed and updated by said generic endpoint state machine.

4. The USB compound device as described in claim 2, wherein the plurality of address/endpoint configurations stored in said address/endpoint management mechanism include a set of address/endpoint configuration of a virtual hub, said set of address/endpoint configuration of the virtual hub is used by said circuitry when it executes the function as a hub via said USB transceiver, said serial interface engine and said microprocessor or controller.

5. The USB compound device as described in claim 2, wherein said circuitry further comprising:
- an endpoint variable register for storing the states of the plural endpoints, said endpoint variable register is accessed and updated by said generic endpoint state machine.

6. The USB compound device as described in claim 2, wherein said address/endpoint management mechanism comprising:
- an address/endpoint configuration mechanism for storing a plurality of logical addresses designated by a USB host, and the correlation between logical endpoints and physical endpoints of each logical address; wherein said generic endpoint state machine utilizes said plural logical addresses to determine whether the plural function devices connected with said USB compound device are the receivers or senders designated by the USB host;
- a physical endpoint configuration mechanism for storing the type, the maximum packet size, and the memory allocation data in said memory module of each physical endpoint; and
- a logical/physical translation module for translating the logical/physical endpoints of the plural function devices connected with the USB compound device.

7. The circuitry as described in claim 3, wherein said circuitry includes:
- a memory buffer for temporarily storing the data being transmitted; and
- a memory management unit for accessing data from said memory buffer, comprising:
  - a memory configuration mechanism of endpoint for storing the memory allocation data and the maximum packet sizes of the endpoints in said memory buffer; and
  - a memory access control unit for accessing data from said memory buffer according to the endpoint numbers of signals, and the memory allocation data stored in said memory configuration mechanism of endpoint.

8. The USB compound device as described in claim 5, wherein said memory module comprising:
- a memory buffer for temporarily storing the data being transmitted; and
- a memory management unit for accessing data from said memory buffer, comprising:
  - a memory configuration mechanism of endpoint for storing the memory allocation data and the maximum packet sizes of the endpoints in said memory buffer; and
  - a memory access control unit for accessing data from said memory buffer according to the endpoint numbers of signals and the memory allocation data stored in said memory configuration mechanism of endpoint.

9. The USB compound device as described in claim 8, wherein said circuitry further comprising:
- an application interface engine for transmitting signals and accessing data between said generic endpoint state machine, said memory access control unit, and the plural non-USB interfaces connected with said circuitry.

10. The circuitry as described in claim 7, wherein said circuitry includes:
- an application interface engine for transmitting signals and accessing data between said generic endpoint state machine, said memory access control unit, and the plural non-USB interfaces connected with said circuitry.

11. The USB compound device as described in claim 6, wherein the plural logical addresses and correlation stored in said address/endpoint configuration include a set of logical address of a virtual hub and the correlation between the logical endpoints and physical endpoints thereof, wherein the address/endpoint configuration of said virtual hub is used by said circuitry when it executes the function as a hub via said USB transceiver, said serial interface engine and said microprocessor or controller.

12. The USB compound device as described in claim 9, wherein said USB compound device includes a microprocessor.

13. The USB compound device as described in claim 9, wherein said USB compound device includes a controller.

14. The USB compound device as described in claim 9, wherein said USB transceiver, said serial interface engine and said circuitry are all fabricated on the same single chip.

15. The USB compound device as described in claim 7, wherein said USB compound device further comprising:
- a repeater for transmitting upstream and downstream USB signals between a USB host and the USB function devices connected with said USB compound device; and
- a connection/removal detecting circuit for detecting connections or removals of a plurality of USB ports, wherein said repeater and said connection/removal detecting circuit enables said USB compound device to provide the plural USB ports.

16. The USB compound device as described in claim 6, wherein said circuitry further comprising:
- an endpoint variable register for storing the states of the plural endpoints, wherein said endpoint variable register is accessed and updated by said generic endpoint state machine.

17. The USB compound device as described in claim 16, wherein said memory module comprising:
- a memory buffer for temporarily storing the data being transmitted; and
- a memory management unit for accessing data from said memory buffer, comprising:
  - a memory configuration mechanism of physical endpoint for storing the memory allocation data and the maximum packet sizes of the physical endpoints in said memory buffer; and a memory access control unit for accessing data from said memory buffer according to the physical endpoint numbers of signals, and the memory allocation data stored in said memory configuration mechanism of physical endpoint.

18. The USB compound device as described in claim 17, wherein said circuitry further comprising:

an application interface engine for transmitting signals and accessing data between said generic endpoint state machine, said memory access control unit, and the plural non-USB interfaces connected with said circuitry.

19. The USB compound device as described claim 18, wherein said application interface engine comprising:

an event control module for receiving the events generated by said generic endpoint state machine and said memory access control unit during communication, and transmitting the events to the devices corresponding to said physical endpoint numbers; and a control interface module for controlling or configuring the registers inside the circuitry, and proceeding with data transmission with the memory control unit;

a data path module for accessing mass data, wherein said data path module transmits data between said memory buffer and the plural interfaces connected with said circuitry in a direct memory access (DMA) manner.

20. The USB compound device as described in claim 19, wherein said USB compound device includes a microprocessor.

21. The USB compound device as described in claim 19, wherein said USB compound device includes a controller.

22. The USB compound device as described in claim 19, wherein said USB transceiver, said serial interface engine and said circuitry are all fabricated on the same single chip.

23. The USB compound device as described in claim 19, wherein said USB compound device further comprising:

a repeater for transmitting upstream and downstream USB signals between a USB host and the USB function devices connected with said USB compound device; and a connection/removal detecting circuit for detecting connections or removals of a plurality of USB ports, wherein said repeater and said connection/removal detecting circuit enables said USB compound device to provide the plural USB ports.

24. A method of enabling a plurality of function devices to connect to a USB host with the same set of endpoint numbers and have their respective and independent USB addresses, comprising the following steps:

configuring the logical endpoints and the correlation between the logical/physical endpoints of the plural function devices in sequence;

storing the configurations of the physical endpoints of the plural function devices;

initiating the address/endpoint configurations of the plural USB function devices and communicating with the USB host in sequence by utilizing a microprocessor or controller, and then designating the plural function devices their respective USB logical addresses by the USB host;

storing the USB addresses designated by the USB host;

comparing the specific address of each signal transmitted from the USB Bus with the USB logical addresses;

proceeding with logical/physical endpoint translation when the comparison matches; and transmitting the signal to the function device represented by the physical endpoint.

25. A method for implementing a virtual hub, comprising the following steps:

using an address/endpoint configuration as the USB address/endpoint configuration of the virtual hub;

receiving signals from or transmitting signals to a USB host by using a USB transceiver;

using a serial interface engine to execute the decoding, encoding and format translation of the transmitted signals, and perform cyclic redundancy check code inspection while transmitting/receiving data;

using a microprocessor or controller to communicate with the USB host in the function of a hub via software or firmware, and getting a USB address of said virtual hub from the USB host;

when the address of the transmitted signal directs to said virtual hub, responding to the USB host with the microprocessor or controller according to the content of the transmitted signal; and managing other USB function devices or reporting the configurations thereof back to the USB host with the microprocessor or controller via software or firmware so as to maintain the USB tiered-star topology.

26. A method for implementing a USB compound device, wherein said compound device is used to connect at least two function devices having no USB logic circuits to a USB Bus, and enable the connected function devices to have the plug-and-play function, said method comprising the following steps:

setting up a physical layer block for connecting to the USB Bus and proceeding with the reception or transmission of signals, format translation, coding or decoding, and cyclic redundancy check code inspection;

setting up a link layer block for receiving the signals transmitted from said physical layer, proceeding the comparison of address/endpoint and communicating with the USB host under communication protocols according to the states of the endpoints;

setting up a memory management unit for receiving endpoint numbers from said link layer and proceeding with data accessing according to the endpoint numbers;

setting up an application interface engine for receiving the signals from said link layer block and said memory management unit, and executing the signals or data transmission with an application unit; and setting up a memory buffer for storing the temporary data of the endpoints.

27. The method as described in claim 26, wherein the step of setting up said physical layer block comprising:

using a USB transceiver to transmit or receive signals and perform the conversion of signal format; and using a serial interface engine to execute the decoding, encoding and format translation of the transmitted signals, and perform cyclic redundancy check code inspection while transmitting/receiving data.

28. The method as described claim 26, wherein the step of setting up said link layer block comprising:

storing the states of the endpoints of the connected USB function devices by an endpoint variable register;

using a generic endpoint state machine to access and update said endpoint variable register and communicate with the USB host under USB standard protocols according to the types of the endpoints;

storing the addresses designated by the USB host and the corresponding endpoints of the function devices by an address/endpoint configuration mechanism;

storing the physical endpoints and its endpoint configurations by a physical endpoint configuration mechanism; and executing the translation of logical endpoints and physical endpoints by a logical/physical endpoint translator.

29. The method as described in claim 26, wherein the step of setting up said memory management unit comprising:

storing the memory buffers designated to the physical endpoints and the states of the data thereof by a memory configuration mechanism of physical endpoints; and using a memory access control unit to read the memory buffer blocks and the states of the data thereof from said memory configuration of physical endpoints, and store or read the data into/from the memory buffers thereof.

30. The method according to claim 26, wherein the step of setting up said application interface engine comprising:

using an event control module to receive the events generated by said generic state machine and said memory access control unit during communication and inform the function devices represented by the physical endpoint numbers in said application unit of the event;

using a control interface module to control or configure the register inside said compound device, and proceed with data transmission with said memory management unit; and using a data path module to access mass data and transmit data between said memory buffers and said application unit in a DMA manner.

31. The method according to claim 26, wherein said method further includes the steps of providing the device a plurality of USB ports, comprising:

using a repeater for transmitting upstream and downstream USB signals between the USB host and the connected USB function devices; and using a connection/removal detecting circuit to detect connections or removals of the USB ports.

* * * * *